United States Patent [19]

Hovis et al.

[11] Patent Number: 5,262,107
[45] Date of Patent: * Nov. 16, 1993

[54] METHOD OF MAKING APERTURED FILM FABRICS

[75] Inventors: Edward E. Hovis, Newark, Del.; Eric D. Johnson, Larsen, Wis.

[73] Assignee: Applied Extrusion Technologies, Inc., Middletown, Del.

[*] Notice: The portion of the term of this patent subsequent to May 4, 2010 has been disclaimed.

[21] Appl. No.: 860,250

[22] Filed: Mar. 31, 1992

Related U.S. Application Data

[63] Continuation-in-part of Ser. No. 720,543, Jun. 25, 1991, Pat. No. 5,207,962.

[51] Int. Cl.⁵ .................. B29C 67/20; B29D 28/00
[52] U.S. Cl. .................................. 264/145; 264/154; 264/156; 264/210.7; 264/284; 264/288.8; 264/290.2
[58] Field of Search ............ 264/145, 154, 156, 288.8, 264/290.2, 147, 146, 210.7, 280, 288.4, 284, 293, DIG. 47

[56] References Cited

U.S. PATENT DOCUMENTS

| | | | |
|---|---|---|---|
| 3,137,746 | 6/1964 | Seymour et al. | 264/154 |
| 3,386,876 | 6/1968 | Wyckoff | 264/171 |
| 3,387,077 | 6/1968 | Sammons et al. | 264/154 |
| 3,441,638 | 4/1969 | Patchell et al. | 264/154 |
| 3,488,415 | 1/1970 | Patchell et al. | 264/154 |
| 3,914,365 | 10/1975 | Kim et al. | 264/147 |
| 3,922,329 | 11/1975 | Kim et al. | 264/147 |
| 4,075,379 | 2/1978 | Lloyd | 428/105 |
| 4,186,781 | 2/1980 | Kim et al. | 28/170 |
| 4,207,375 | 6/1980 | Kim et al. | 428/286 |
| 4,274,251 | 6/1981 | Kim et al. | 428/399 |
| 4,303,714 | 12/1981 | Mercer | 264/288.8 |
| 4,568,596 | 2/1986 | Johnson | 264/147 |
| 4,705,812 | 11/1987 | Ito et al. | 264/154 |
| 4,793,956 | 12/1988 | Nogira et al. | 264/154 |
| 4,842,794 | 6/1989 | Hovis et al. | 264/145 |
| 4,859,519 | 8/1989 | Cabe, Jr. et al. | 264/156 |
| 4,998,486 | 12/1990 | Ito et al. | 264/154 |

FOREIGN PATENT DOCUMENTS 1308866 3/1973 United Kingdom.
1552491 9/1979 United Kingdom.

Primary Examiner—Jay H. Woo
Assistant Examiner—Robert B. Davis
Attorney, Agent, or Firm—Caesar, Rivise, Bernstein, Cohen & Pokotilow

[57] ABSTRACT

An apertured thermoplastic fabric is formed by extruding, in the form of a film, a molten thermoplastic polymer having a secant modulus of no greater than 50,000 psi, embossing the film in a nip provided between a smooth surfaced roll and a patterned roll, wherein the patterned roll includes a plurality of discrete, raised projections disposed in a pattern and each of which includes a sharp distal end; applying sufficient pressure at the nip of the patterned and smooth surfaced rolls for causing a plurality of small apertures to be formed in the extruded film in substantially the same pattern as the pattern of discrete, raised projections; orienting the apertured film in both the cross-machine direction and in the machine-direction, and thereafter embossing the oriented film on at least one surface with a plurality of raised members spaced closer to each other than the spaces between the apertures in the oriented film, to thereby provide a matte-type finish on at least one surface. The formed fabric also forms a part of the present invention.

25 Claims, 5 Drawing Sheets

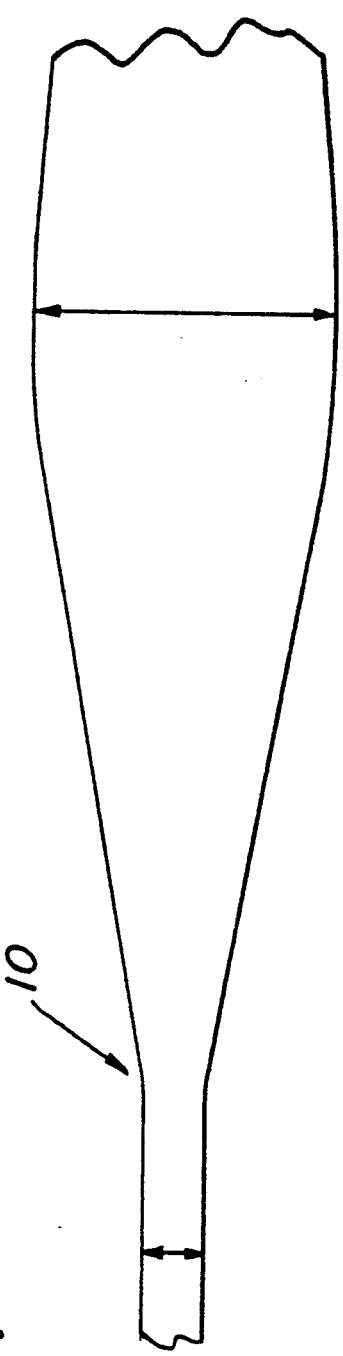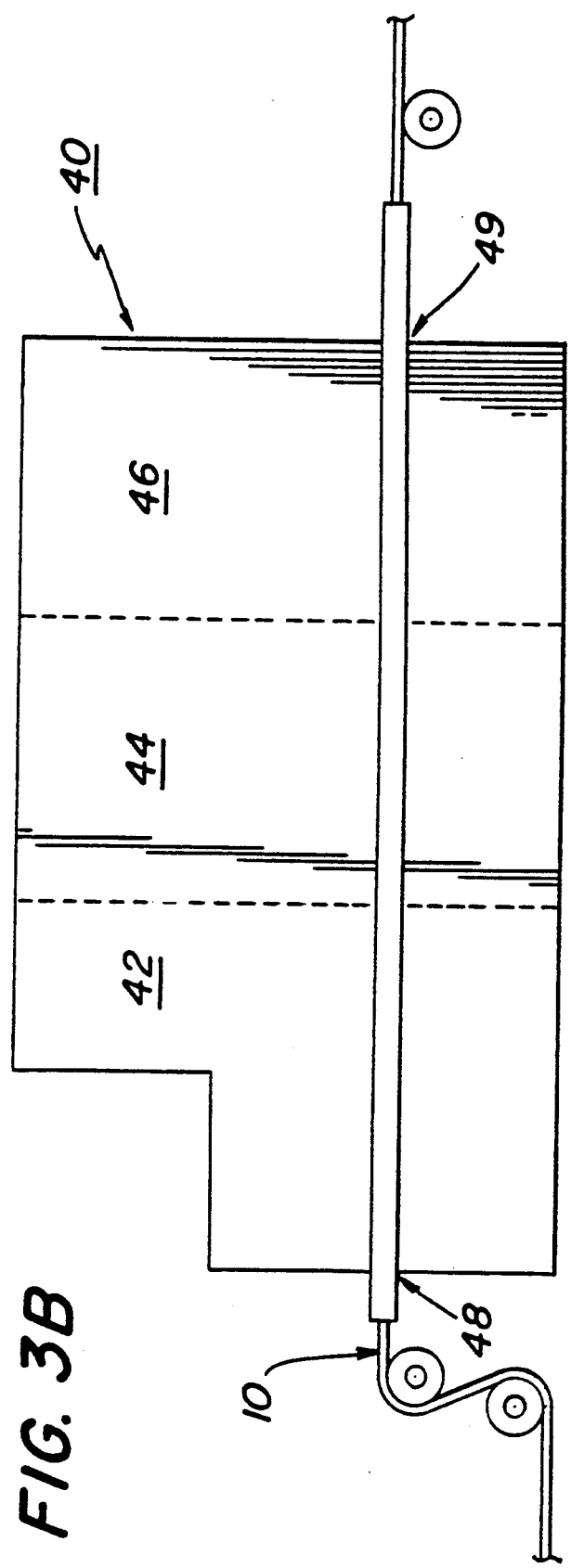
FIG. 4
FIG. 3B

METHOD OF MAKING APERTURED FILM FABRICS

RELATED APPLICATION

This application is a continuation-in-part of application Ser. No. 07/720,543, filed on Jun. 25, 1991, and now U.S. Pat. No. 5,207,962, entitled "Method of Making Apertured Film Fabrics and Fabrics Made Thereby."

FIELD OF THE INVENTION

This invention relates generally to a process of fabricating an apertured film fabric and to the fabric prepared thereby. In particular, this invention relates to a process of forming an extruded, apertured film having a generally cloth-like appearance and "hand", rendering it highly desirable for use in a variety of applications wherein fibrous, woven and non-woven fabrics have been employed in the past, e.g., facing sheets for absorbent sanitary products such as sanitary napkins, incontinent pads, and the like.

BACKGROUND OF THE INVENTION

It is well known to fabricate apertured thermoplastic webs for a variety of applications, and the prior art is replete with disclosures relating to such webs and to processes for making them. However, most of the prior art apertured thermoplastic webs lack the desired appearance and hand to make them suitable for use as a facing sheet for sanitary products (e.g., sanitary napkins and incontinent pads), as well as for a variety of other applications wherein substantially cloth-like properties are desired and/or required.

In a substantial number of processes high density polyethylene, polypropylene, and other high modulus, crystalline polymers have been formed into plastic sheets, and then embossed with a variety of patterns designed to form thin areas in such sheets. These sheets, subsequent to embossing, are oriented either uniaxially or biaxially to cause the crystalline web to actually open up, or fracture, into a network of apertures in the thinned regions. Representative patents disclosing such a process are U.S. Pat. Nos. 3,914,365; 3,441,638; 3,488,415; 4,075,379; 3,922,329; 4,207,375; 4,186,781; 4,274,251; and 4,568,596.

In U.S. Pat. No. 3,386,876, Wyckoff discloses a process for manufacturing an apertured, thermoplastic web in which the apertures are defined by a plurality of uniaxially drawn strands which are separated from each other by undrawn portions. One approach to initially forming the apertures before stretching the film is to punch the apertures into the web in a repeating, hexagonal pattern.

As is shown in FIG. 10 of the Wyckoff '876 patent, the biaxially oriented web, which initially is formed with a hexagonal pattern of apertures, has a plurality of spoke-like, uniaxially drawn strands emanating from a central undrawn hub portion, and terminating at their opposite ends in similar undrawn portions. Wyckoff's structures are disclosed as being made from polypropylene, not from low density or ultra low density polyethylene or other low crystallinity polymers. As will be seen from the description of the present invention, the structure achieved in the Wyckoff patent is not desired in the present invention, and indeed would not be formed in the polymeric materials employed in the present invention.

In order to form apertured thermoplastic films or webs which closely simulate in appearance and hand fibrous non-woven and woven fabrics, applicants have recognized that the thermoplastic films should be extruded from softer (i.e., lower secant modulus) polymers than the prior art crystalline polymers employed in connection with the above discussed prior art processes. However, processing these softer, low crystallinity polymers to form apertured thermoplastic films simulating in appearance and hand the properties of conventional fibrous non-woven and woven fabrics has not been an easily attainable objective.

In particular, applicants discovered that a number of embossing patterns and arrangements which successfully have been employed to form apertured thermoplastic webs from high density polyethylene and other high crystallinity polymers do not form a desirable apertured structure in lower crystallinity polymers. In particular, applicant discovered that thinned regions formed in soft, low crystallinity polymers do not tend to open up into apertures in a predictable manner, when the extruded polymer films are either uniaxially or biaxially oriented.

In U.S. Pat. No. 4,842,794, the present inventors disclose a unique, two-sided embossing arrangement which, unlike prior art, single-sided embossing arrangements, can be effectively utilized to form an apertured film from soft, non-crystalline polymers. In accordance with the teachings of '794 patent the two-sided embossing pattern actually formed slits through the web during melt embossing, and the film is subsequently biaxially stretched to open up the slit regions into a pattern of defined apertures. In other words, prior to the instant invention applicants determined that the specific two-sided embossing arrangement disclosed in the '794 patent functioned to actually slit the extruded polymer film, thereby making it possible to enlarge the slits into apertures by the subsequent step of biaxially orienting the film.

There is absolutely no suggestion in the '794 patent that single-sided embossing (e.g., pattern roll against smooth surface roll) could be employed to form an apertured web in polymers having a secant modulus less than 50,000 psi. In fact, applicants' prior experience with single-sided embossing arrangements, in connection with the processing of high density polyethylene webs, was that thinned (not slit) regions were formed, and that such thinned regions actually cracked, or fractured, to form a defined pattern of apertures when the extruded film was either uniaxially or biaxially oriented. However, prior to the invention forming the subject matter of the present application, applicants also had determined that thinned regions formed in soft, very low density polyethylene (e.g., Union Carbide DFDA 1137) by the use of some of the same embossing patterns employed to form thinned regions in high density polyethylene webs, did not crack and form apertures upon subsequent biaxial orientation on the processing equipment operated and owned by applicant's assignee.

Although an apertured fabric can be formed from extruded low density polyethylene employing the two-sided embossing arrangement disclosed in the Hovis et al. '794 patent, that product tended to have a number of strand-like polymer sections projecting in multiple planes, providing an undesired tactile feel to the product.

Thus, prior to the present invention, the prior art suggested that single-sided embossing patterns employed to form thin regions in extruded, crystalline polymers would form the same type of thin regions in softer, low-density, very low density and ultra low density polyethylene or other low crystallinity polymers. Moreover, although the thinned regions in the highly crystalline polymers opened into apertures when the film was either uniaxially or biaxially oriented, prior art thinking was that such thinned regions formed in the aforementioned softer, low crystallinity polymers would not (and in fact did not), with any degree of predictability, open up into an apertured fabric upon uniaxial or biaxial orientation.

In fact, prior to this invention applicants believed that in order to form apertured webs from soft, low density, very low density and ultra low density polyethylene or other low crystallinity polymers, the molten, extruded film needed to be embossed by opposed patterned rolls (i.e., two-sided embossing) of the type disclosed in the Hovis et al. '794 patent. As indicated earlier, although the use of opposed patterned rolls does successfully form a defined apertured pattern in low density and very low density polyethylene film, the three-dimensional, strand-like configuration imparted to the film has been perceived to be undesirable for a number of applications, including use as a facing sheet for sanitary absorbent products, such as sanitary napkins and incontinent pads.

OBJECTS OF THE INVENTION

Accordingly, it is a general object of this invention to provide a process for preparing an apertured thermoplastic film having a textile-like appearance, softness and hand.

It is a further object of this invention to provide a process for preparing an apertured thermoplastic film having an appearance, softness and hand making it well suited for use as a porous cover sheet for sanitary products, such as sanitary napkins and incontinent pads.

It is still a further object of this invention to provide a process for preparing a soft and tough apertured thermoplastic film having an aesthetically pleasing apertured configuration.

SUMMARY OF THE INVENTION

The above and other objects of the present invention are achieved in a process for preparing an apertured thermoplastic film by extruding, in the machine direction, a film from a molten thermoplastic polymer having a secant modulus, in the range of 1%-2% strain, of no greater than 50,000 psi, as determined either by ASTM D790-86 or ASTM D882-83. Thereafter, the extruded film is passed through the nip of two metal rollers, one of which has a substantially smooth surface and the other of which includes a plurality of discrete, raised projections disposed in a pattern, with each of the projections terminating in a sharp distal end. The distal ends of the projections are spaced apart from each other in both the axial and circumferential directions of the roller, and sufficient pressure is applied at the nip of the patterned and smooth surfaced rollers for causing a plurality of small spaced-apart apertures to be formed in the extruded film in substantially the same pattern as the pattern of discrete, raised projections of the patterned roller. Thereafter, the apertured film is oriented in both the cross machine direction and the machine direction, either sequentially or simultaneously, to increase the open area of the apertures and strengthen the film, with the film being substantially planar and being free of continuous strand-like sections. Thereafter, with the web at a temperature below its melt temperature, the oriented film is provided with a micro-matte finish by directing the film through an embossing nip provided by a patterned roll and a smooth surface roll. The patterned roll is provided with a plurality of raised regions spaced closer to each other than the spaces between the apertures in the oriented film, to thereby provide a matte-like finish on at least one surface of the film.

In the most preferred embodiment of this invention the discrete raised projections providing apertures in the film are in the form of sharp cones which are disposed in a repeating, regular geometric pattern. Most preferably the repeating pattern is hexagonal.

In the most preferred embodiment of the process the extruded film is extruded from a polymer having a secant modulus in the range of 1%-2% strain, of no more than 20,000 psi, as determined either by ASTM D790-86 or ASTM D882-83. Most preferably the polymer is an ultra low density polyethylene/octene copolymer.

All references to "secant modulus" in this application refers to the secant modulus anywhere in the range of 1%-2% strain, as determined in both the machine direction and cross-machine direction on a one (1) mil blown film under ambient conditions (i.e., nominally 70° F. and 50% humidity) employing either ASTM D882-83 or D790-86.

Apertured film fabrics of this invention are well suited for use as facing sheets for absorbent sanitary products of the type that generally include an absorbent central core made from fluff or other well known absorbent material, and a moisture impervious plastic back sheet.

BRIEF DESCRIPTION OF THE DRAWINGS

The above and other attendant advantages of this invention will become readily apparent from the detail description which follows when taken in conjunction with the following drawings wherein:

FIGS. 3A through 3D schematically show a continuous manufacturing line for carrying out the process of the present invention;

FIG. 4 is a fragmentary plan view showing the manner in which the web of the invention is stretched in the cross-machine direction in the portion of the apparatus shown in FIG. 3B;

DETAIL DESCRIPTION OF THE PREFERRED EMBODIMENTS

Figure 3A:
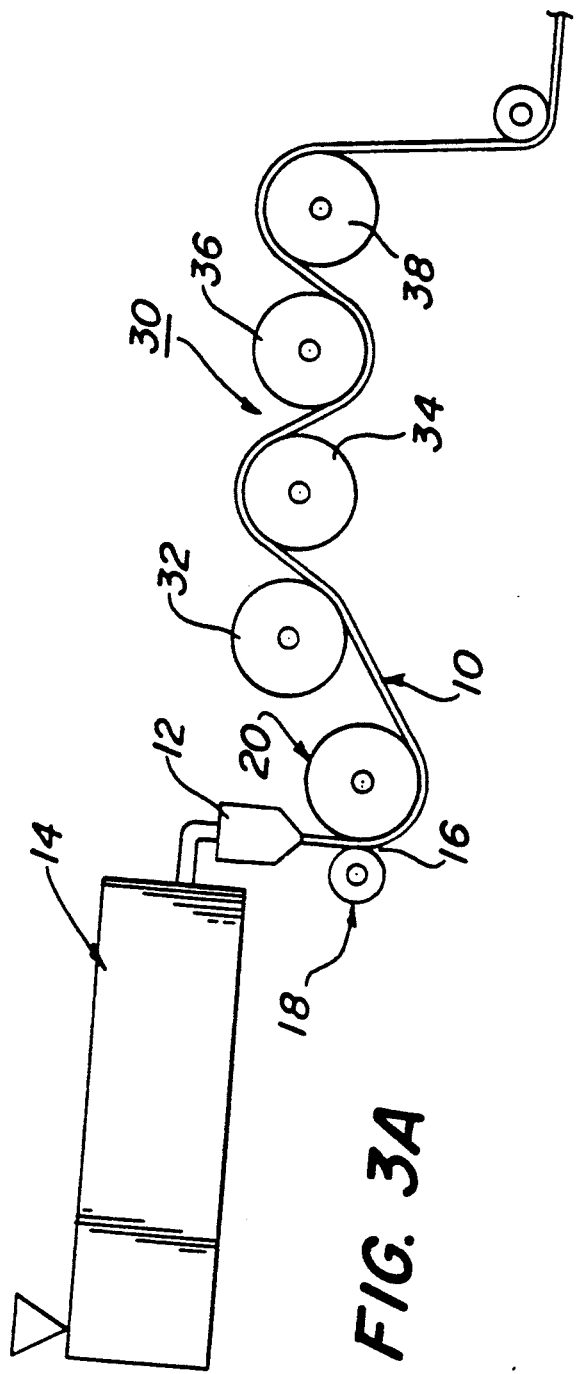

Referring to FIG. 3A, a molten, thermoplastic web 10 is extruded through a die 12 of a conventional extruder 14. The thermoplastic polymer, details of which will be described later, has a melting point of approximately 115° C., and the die 12 is maintained at a temperature in the range of about 240° C. to about 250° C., at its exit end.

As can be seen in FIG. 3A, the web 10 exits the die in a substantially vertical orientation and immediately enters the nip 16 provided between a patterned, metal embossing roll 18 and a smooth surfaced, metal backup roll 20. In accordance with this invention both the embossing roll and the backup roll preferably are maintained at a temperature in the range of between 20° C.–70° C., and most preferably at approximately 45° C. Moreover, it has been determined that the smooth surface of the backup roll 20 should be formed with a crown, i.e., if should be provided with a convex curvature in the axial direction. In an exemplary embodiment the roll 20 is provided with a curvature such that the radius of the roll on the center is approximately 4 mils greater than the radius of the roll at each axial end. Providing a crown on the roll has been determined to be desirable to compensate for flexing of the rolls, which occurs during embossing. It may be possible to eliminate the crowning of the roll 20 by increasing the size of both rolls so that they do not flex.

The embossed web 10 passes about the periphery of the smooth surfaced backup roll 20 and is directed through a predraw unit 30. This predraw unit is shown schematically as including four smooth surfaced metal rolls 32, 34, 36 and 38. However, the number of rolls employed does not constitute a limitation on the broadest aspects of the present invention.

In the most preferred embodiment of the invention the most upstream roll 32 in the predraw unit 30 is driven at a rotational speed of approximately 70 feet/minute, and each of the following rolls 34, 36 and 38 is driven at a rotational speed approximately one foot per minute faster than the immediately preceding roll; resulting in the web 10 being stretched approximately 6% in the machine direction. The primary purpose of the predraw unit is not necessarily to stretch the web, but rather to maintain tension on the web to control the process.

Referring to FIGS. 3B and 4, the web 10 is directed from the predraw unit 30 into a tenter unit 40, in which the web is stretched in the cross-machine direction. As is illustrated in FIG. 3B, the tenter unit 40 is provided with three heated zones 42, 44 and 46, located between the entrance 48 and exit 49 thereof.

In accordance with a preferred form of this invention the overall length of the tenter unit 40 is approximately 45 feet. The web 10 enters this unit with a cross-machine direction width of 23 inches, and exits the unit with a cross-machine direction width of 60 inches. Thus, the web 10 is stretched approximately 2.6 times of its entrance width (approximately 260%) between the entrance 48 and the exit 49 of the tenter unit 40. It should be noted that the tenter unit 40 is a conventional unit sold by Marshall and Williams in Rhode Island, and includes opposed, transversely spaced-apart chain-driven rows of clamping jaws (not shown) which are designed to automatically clamp the longitudinally extending edges of the web 10, as the web enters the tenter section at entrance 48. These jaws, as they are being moved in the machine-direction, are directed transversely away from each other in the cross-machine direction to transversely stretch the web 10, as is illustrated in FIG. 4.

Figure 3C:
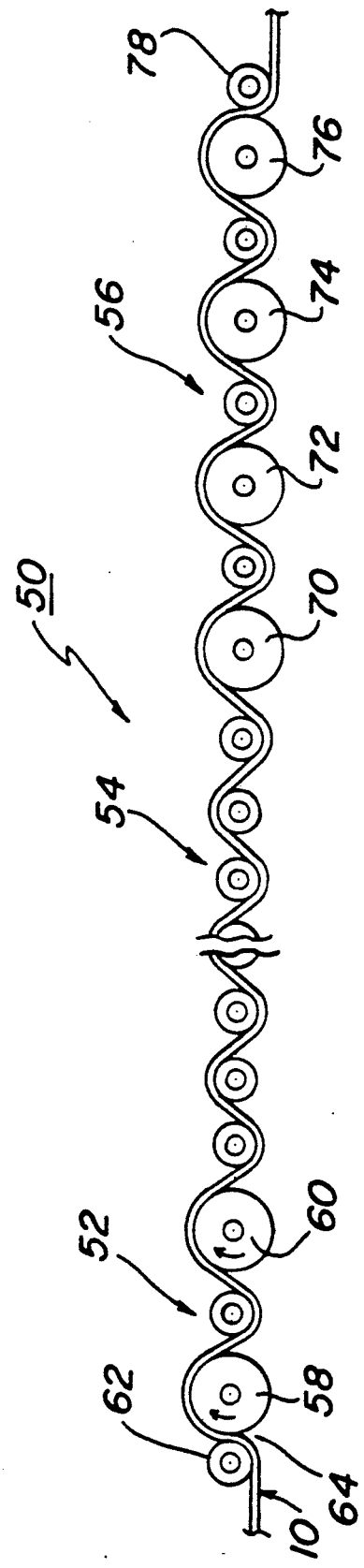

Referring to FIG. 3C, after the web 10 has been stretched in the cross-machine direction in the tenter unit 40 it is directed into a machine direction stretcher unit 50. This latter stretcher unit includes an entrance section 52, an idler section 54 and an exit section 56.

The entrance section 52 includes two large driven rolls 58 and 60 (e.g., 10 inches in diameter), which preferably are driven at a speed in the range of approximately 75–78 feet per minute, which is the speed at which the web 10 exits the tenter section 40 at 49.

It should be noted that a small diameter roll 62 engages driven roller 58 to define a drive nip 64 at the entrance section 52, to thereby positively move the web into the stretcher unit 50 at the desired entrance speed. In a preferred embodiment of this invention the rollers 58 and 60 are driven at approximately 76 feet per minute.

Still referring to FIG. 3C, the exit section 56 includes a plurality of large diameter, driven rolls, four of which are illustrated at 70, 72, 74 and 76. The most downstream driven roll 76 engages roll 78 to define a nip therebetween, for controlling the exit speed of the web 10. In accordance with a preferred embodiment of this invention the speed of the driven rolls 70, 72, 74 and 76 is in the range of approximately 130–140 feet per minute.

Located between the entrance section 52 and exit section 56 is the idler section 54. This idler section includes a plurality of idler (non-driven) rolls which are separated from each other, but spaced close together. The number of idler rolls can be varied in accordance with this invention, with the number of idler rolls utilized in an exemplary embodiment being eleven (11).

In the illustrated embodiment the stretcher unit 50 includes four distinct and separated heated zones. Most preferably each of the heated zones is at a temperature slightly less than the melt point of the polymer.

Referring to FIG. 3, in the illustrated embodiment of this invention the rolls in the entrance section 52 and the most upstream idler roll of the idler section 54 are maintained at a temperature of approximately 106° C. The idler section 54 is provided with a set of 4 (or 5) idler rolls downstream of the first idler roll, which are heated to a temperature of approximately 106° C., and an immediately subsequent, or further downstream set of 5 (or 4) idler rolls, which are maintained at a temperature of approximately 103° C. This latter set of idler rolls is followed by a single idler roll and the rolls in exit section 56, which preferably are maintained at a temperature of approximately 100° C. From the above explanation it should be noted that the web 10 is gradually reduced in temperature as it is directed through stretcher unit 50.

In an alternative embodiment of a machine-direction stretcher unit (not illustrated) only three distinct and separate heated zones are provided. In this embodiment the entrance section and idler section include the identical roll arrangement as entrance section 52 and idler section 54 of the machine direction stretcher unit 50. However, the rolls in the entrance section and the most upstream idler roll of the idler section in the alternate embodiment of this invention are maintained at a temperature of approximately 103°–104° C., as opposed to 106° C. The first set of four (4) or five (5) idler rolls downstream of the first idler roll are heated to a temperature of approximately 105°-106° C. (substantially the same as in the stretcher unit 50); however, the further downstream set of five (or four) idler rolls are maintained at a temperature of approximately 109° C. (as opposed to 103° C. in the stretcher unit 50). Unlike the stretcher unit 50, the alternate stretcher unit does not include a single idler roll following the second set of five (or four) idler rolls, and does not include a separate exit section 56.

In accordance with the exemplary embodiment of this invention employing stretcher unit 50, wherein the driven rolls 58 and 60 at the entrance section 52 are maintained at a speed of approximately 76 feet per minute and the driven rolls 70 and 72 at the exit section 56 are maintained at a speed of approximately 120-130 feet per minute, the stretcher unit 50 stretches the web 10 approximately 158%-171% in the machine direction.

Figure 3D:
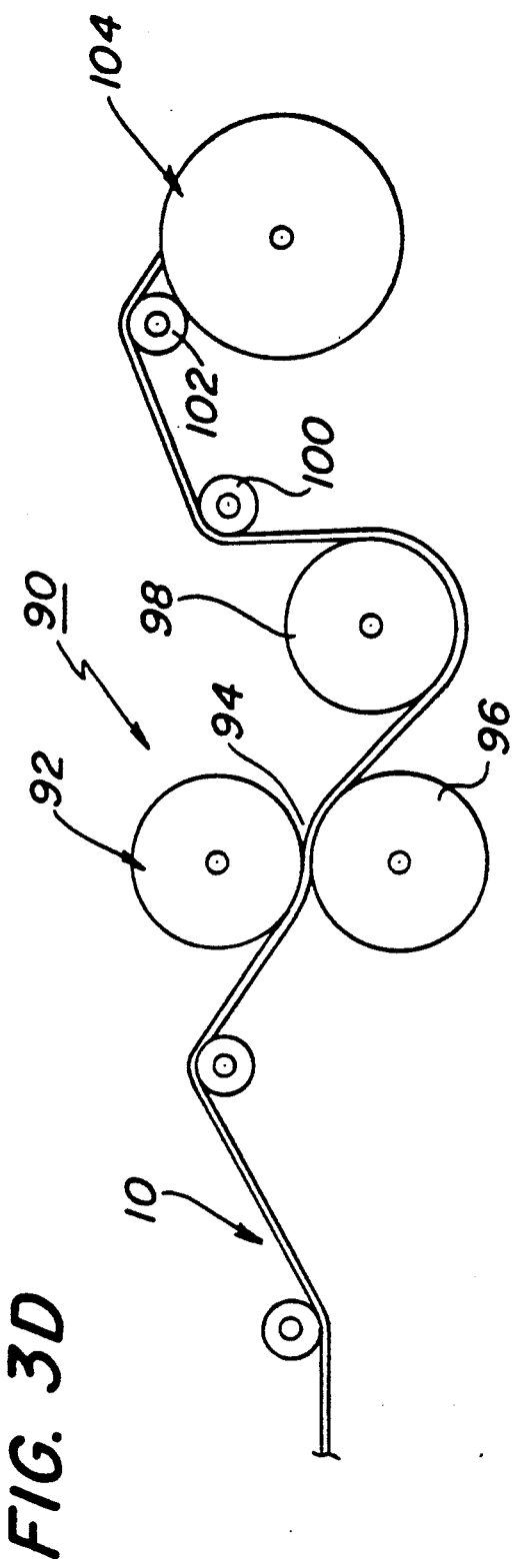

Referring to FIG. 3D, after the apertured web 10 exits the stretcher unit 50 it is directed into a texturizer and winder section 90. In the illustrated embodiment the stretcher unit 50 is shown as a continuous extension of the web forming line, and includes a driven metal pattern roll 92 forming a nip 94 with a smooth surfaced, resilient backup roll 96. The backup roll 92 preferably is a metal roll coated with a rubber, plastic or paper, and is selected to reduce the gloss of the web. A preferred roll presently under consideration is made from a synthetic polymer, identified as Supertex by Beloit Corporation of Kalamazoo, Mich. Beloit will not reveal any details relating to the chemistry of Supertex. Most preferably the pattern roll 92 is temperature controlled to a temperature that is dependent upon a number of factors, including its speed of rotation, its diameter and the pressure at nip 94, with the temperature being selected to reduce gloss in the formed web.

In the present practiced embodiments of this invention the texturizer and winder section 90 is an off-line unit, adapted to receive the film after it has been wound into a roll form from the machine direction stretcher unit 50. In this off-line unit the pattern roll 92 is 12 inches in diameter, is run at 200-400 feet per minute, is loaded to apply a pressure of approximately 1,600 pounds per lineal inch at the nip 94, and is not heated.

The backup roll 96, in an exemplary embodiment of the invention, is approximately 16 inches in diameter, and preferably is temperature controlled to a temperature of approximately 100° F. However, when the backup roll is made of Supertex it may maintain a desired temperature without the use of any special temperature control equipment.

It should be understood that the texturizer and winder section 90 can be included in line with the remainder of the film forming system, as is illustrated in the drawings. Whether the texturizer and winder section 90 is provided as part of the continuous film forming operation will be determined by the economics of making the line, as opposed to the ability to form acceptable apertured web structures in accordance with the present invention.

In view of the fact that the web is not heated during the texturizing operation applicant has determined that it is not necessary to provide any subsequent cooling operation. Accordingly, in the preferred embodiment of this invention the completed web is wound into a continuous roll form, immediately after leaving the texturizer and winder section 90.

However, it should be understood that in the event it is necessary to heat the pattern roll and/or back up roll to effect texturizing, the patterned roll can be followed by a cooling roll 98, which will be maintained at a suitable temperature to set the web prior to the web being directed over guide rolls 100 and 102, and then on to a driven winder roll 104.

A very important feature of the process of this invention resides in the combination or selection of the proper embossing pattern and the proper thermoplastic polymer composition. In fact, applicants have determined that utilizing the same embossing roll pattern on molten film made from different polymers does not necessarily provide or form the same pattern of apertures in the completed web. In fact, grossly varying configurations have been achieved with the same embossing roll pattern, merely by employing the embossing pattern on different polymer compositions.

For example, the most preferred configuration of the embossing pattern of pattern roll 18 has been used in the past in connection with the fabrication of apertured webs formed from highly crystalline, high secant modulus thermoplastic polymers, such as high density polyethylene. When used with these latter polymers the embossing pattern of projections on the roll 18 (which will be described in detail hereinafter) merely formed thinned areas in the molten film, rather than apertures therethrough. Upon subsequent stretching in the machine and cross-machine directions, the thinned regions opened up or fractured, providing a plurality of strand-like segments extending radially from central, substantially unstretched boss regions and terminating at their opposed ends in similar unstretched boss regions. As will be explained later in this application, the pattern and arrangement of apertured and unapertured sections in webs formed in accordance with this invention are materially different from the above prior art structure.

From the above explanation it should be noted that the prior art products made with the embossing pattern of pattern roll 18 included both stretched and unstretched regions, providing a variation in properties throughout the machine and cross-machine direction of the web. In addition, the location of strand-like sections in multiple planes provided a surface feel or hand which has been perceived as being undesirable for facing sheet cover stock for sanitary napkins and similar absorbent products.

Figure 6:
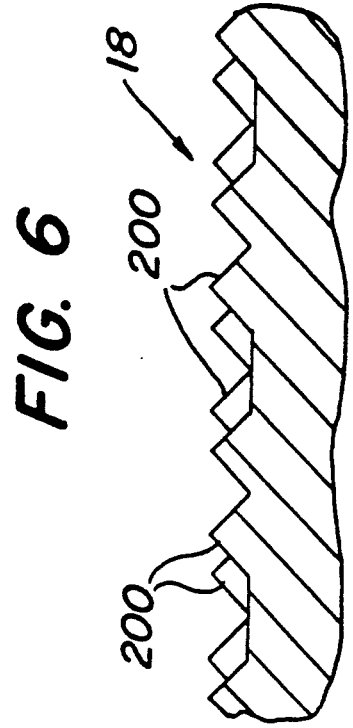
FIG. 6 is a sectional view taken along line 6—6 of FIG. 5.
Figure 5:
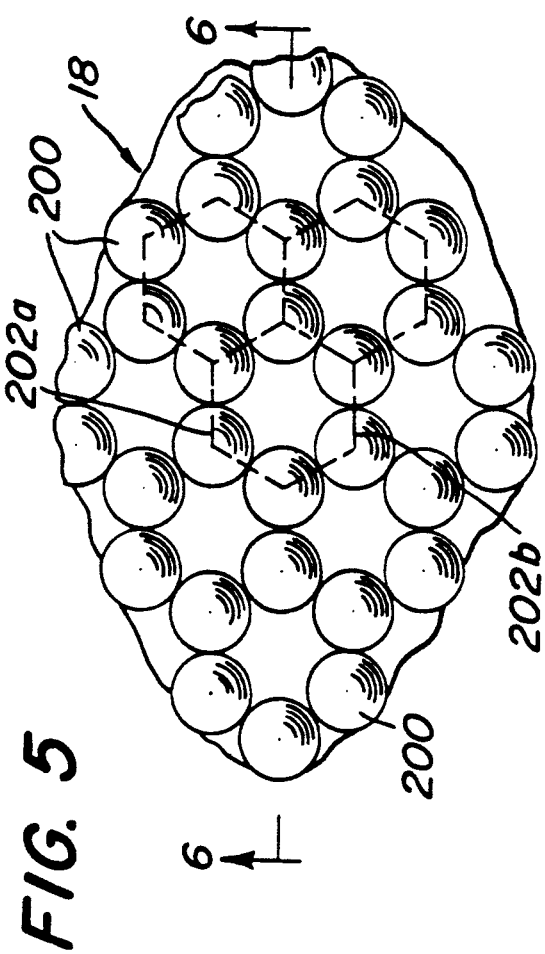
FIG. 5 is a partial plan view of the embossing roll employed to form apertures in the film, in accordance with the process of this invention.

Turning now to FIGS. 5 and 6, the configuration of the embossing roll 18 will now be described in detail. Specifically, the embossing roll pattern includes a plurality of discrete cones 200 arranged in a repeating, hexagonal pattern, as is illustrated by phantom lines in FIG. 5. However, other geometric patterns may be usable in this invention.

In the most preferred form of this invention the height of the cones is approximately equal to or slightly greater than 0.0105 inches, and the diameter of each cone, at the base thereof, is approximately 0.023 inches, with the bases of adjacent cones being in engagement with each other.

As can be seen best in FIG. 5 phantom lines 202a and 202b, which interconnect adjacent cones forming part of each hexagon, are parallel to each other and extend substantially perpendicular to the circumferential direction (i.e., machine direction) of the roller. Most preferably the circumferential spacing between adjacent phantom lines 202a and 202b is approximately 0.040 inches, resulting in a repeating pattern of approximately 25 hexagons per linear inch in the circumferential direction around the roll.

In accordance with broader aspects of this invention the projections are disposed in a regular geometric pattern (most preferably hexagonal) that repeats less than 50 times per inch in the circumferential direction around the roll; more preferably less than 35 per inch, and even more preferably no more than 25 per inch. In the preferred form of this invention the concentration of projections is such that the geometric pattern repeats 25-35 times per inch in the circumferential direction around the roll.

In accordance with this invention the hexagonal pattern of cones can be arranged such that the cones interconnected by phantom lines 202a and 202b are aligned in the circumferential direction around the roll 18, i.e., perpendicular to the axis of said roll. In other words, the hexagonal pattern can be reoriented 90 degrees from the position illustrated in the drawings. When the hexagons are reoriented such that the phantom lines 202a and 202b each are oriented in the circumferential direction around the roll, then the concentration of repeating hexagons referred to earlier will be in the axial direction along the roll, as opposed to the circumferential direction around the roll. It should be understood that when other geometric patterns of cones are provided they likewise may be reoriented 90 degrees, whereby the concentration of the repeating pattern will be in the axial, as opposed to the circumferential direction around the roll.

As was stated earlier, an extremely important feature of the present invention resides in the composition of the thermoplastic polymer web 10 employed in conjunction with the embossing roll 18.

In the most preferred embodiment of this invention the thermoplastic film is formed from a polymer having a 2% secant modulus no greater than 50,000 psi. This is in distinction to the prior art, high density polyethylene compositions, which have a 2% secant modulus in excess of 100,000 psi. In the preferred embodiments of this invention the thermoplastic film is made from a polymer selected from the group consisting of low density polyethylene, low density polyethylene copolymers (such as ethylene vinyl-acetate, ethylene butyl acrylate, ethylene methyl acrylate, ethylene ethyl acrylate, ethylene methyl methacrylate, ethylene acrylic acid, ethylene methacrylic acid, or ethylenic ionomers), linear low density polyethylene, very low density polyethylene, ultra low density polyethylene, or blends of polymers in which the major component is low density polyethylene, low density polyethylene copolymers, linear low density polyethylene, very low density polyethylene, ultra low density polyethylene, or the above-mentioned polymers and polymer blends containing pigments or processing aids.

In the most preferred form of this invention the thermoplastic film is made from an ultra low modulus thermoplastic polymer having a 2% secant modulus of no more than 20,000 psi, and most preferably is an ultra low density polyethylene/ octene copolymer sold under the tradename Attane 4701 by the Dow Chemical Company of Midland, Mich. This polymer is an extremely tough polymer having a melt index of 1 gram/10 min, as determined by ASTM test method D-1238E. The density of this polymer is approximately 0.913, as determined by ASTM test method D-792. The above preferred polyethylene/octene copolymer includes slip and anti-block additives and a phosphonite secondary antioxidant.

Added to the preferred ultra low density polyethylene/octene copolymer of this invention is a fluoropolymer copolymer lubricant to enhance processibility. A preferred lubricant employed in this invention is Ampacet 10562, manufactured by Ampacet Corporation of Tarrytown, N.Y.

Also added to the composition is a whitening agent or concentrate such as one employing titanium dioxide ($TiO_2$). In a preferred embodiment of the invention the whitening agent employed is Ampacet 41914. This agent, which is utilized in the form of a master batch, includes 50% low density polyethylene, 50% titanium dioxide, less than 1% aluminum stearate (a lubricating agent) and 200 parts/million of Irganox 1010 (an antioxidant).

Another additive to the composition is calcium carbonate ($CaCo_3$), which is added as a filler. In a preferred embodiment of this invention the calcium carbonate is part of a master batch, sold under the designation Ampacet 11147. This product includes 50% calcium carbonate, and 50% low density polyethylene as a carrier for the calcium carbonate.

Figure 1:
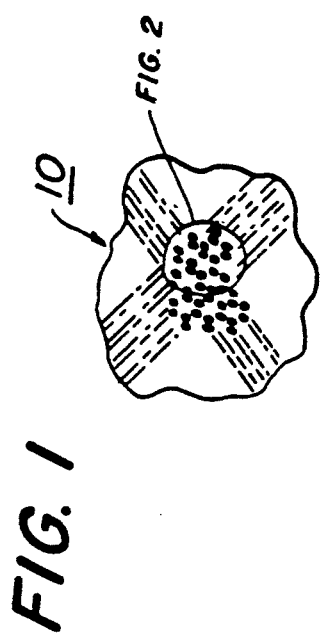
FIG. 1 is a fragmentary plan view illustrating the apertured web made in accordance with the process of this invention.
Figure 2:
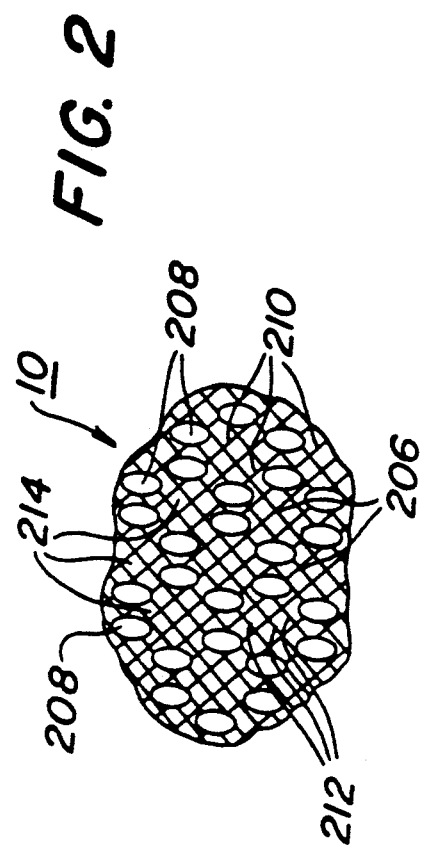
FIG. 2 is an enlarged view of the circled section of FIG. 1, showing details of construction of the apertured web formed in accordance, with this invention.
Figure 7:
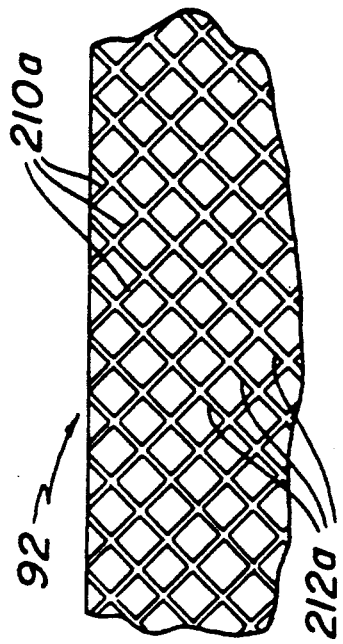
FIG. 7 is a partial plan view of the embossing roll employed to form the matte finish in the apertured web.
Figure 8:
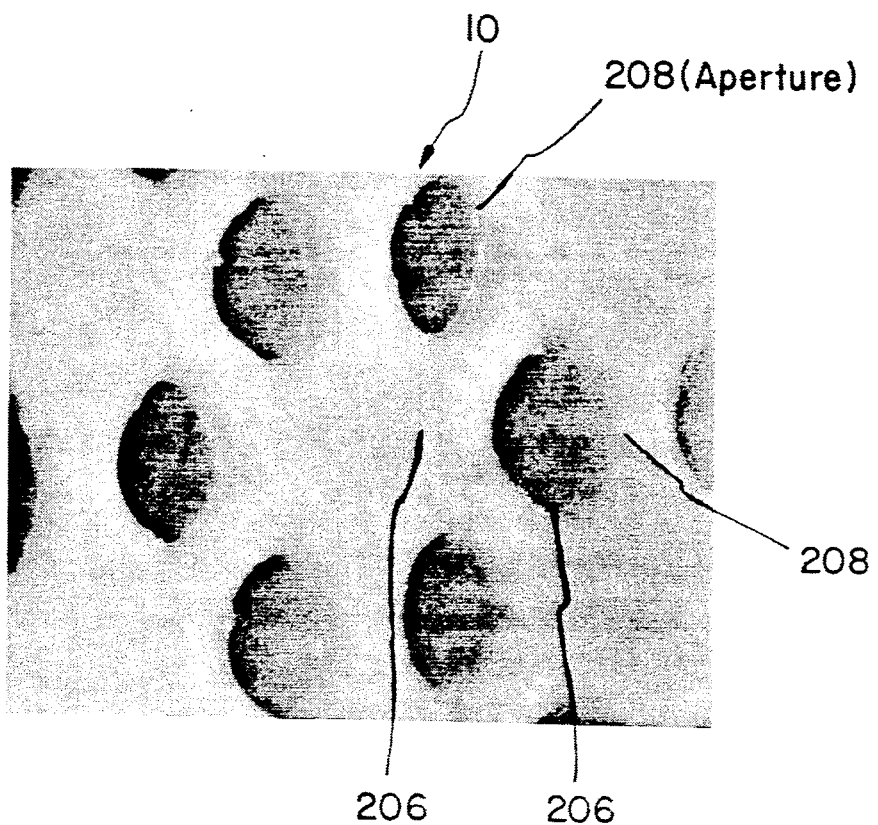
FIG. 8 is a photograph at 25X magnification of a portion of the upper surface of the web made in accordance with the process of this invention.

Referring to FIGS. 1, 2 and 8 the unique web construction formed in accordance with this invention is illustrated. Specifically, the web 10 is a substantially planar, film-like member having a thickness preferably in the range of from about 1.5 mils to 4.5 mils, more preferably in the range of 1.5 mils and 3.0 mils, and most preferably approximately 2.5 mils. The web includes a plurality of film-like areas 206 (as opposed to thin strand-like sections disposed in different planes) which are interrupted by a plurality of apertures 208 disposed in a hexagonal array. Each of the apertures 208 has a substantial elliptical configuration formed by a substantially smooth continuous curved surface free of sharp edges. Located in at least the upper surface of the film-like areas is a micro-texturizing pattern which is provided by the earlier identified pattern roll 92. As can be seen in FIGS. 2 and 8, this pattern includes a plurality of compressed, linear lines that are spaced closer to each other than the spaces between the apertures in the oriented film, to thereby provide the micro matte-type finish. Specifically, this matte-type finish includes two separate sets of compressed parallel lines 210 and 212, which are formed by a series of raised, linear ribs 210a and 212a, respectively, formed on the surface of pattern roll 92 (see FIG. 7). The spacing between the lines 210 and between the lines 212 measured from center to center, is in the range of 3-10 mils, and most preferably is 6.7 mils. As can easily be seen in FIGS. 2 and 8, the sets of compressed lines 210 and 212 formed in the web 10 intersect each other, with each set of lines 210 and 212 being disposed at an acute angle to the machine-direction of web formation to form diamond-shape bosses 214 in the web. By employing the texturizing, embossing operation the film-like areas between apertures are provided with a more textile-like "hand" and appearance (e.g., lower gloss) than would be obtained without such an operation.

Without further elaboration the foregoing will so fully illustrate our invention that others may, by applying current or future knowledge adopt the same for use under various conditions of service.

What we claim as the invention is the following:

1. A process for the preparation of an apertured thermoplastic fabric comprising the steps of:

(a) extruding, in the machine direction, a film from a molten thermoplastic polymer having a secant modulus of no greater than 50,000 psi;

(b) passing the molten, extruded film in the machine direction through the nip of two metal rollers, one of said rollers having a substantially smooth surface and the other of said rollers including a plurality of discrete, raised projections disposed in a pattern, with each of said projections terminating in a sharp distal end, said distal ends of said projections being separated from each other and being completely surrounded by continuous, surface regions located proximally of said distal ends;

(c) applying sufficient pressure at the nip for causing a plurality of small apertures to be formed in the extruded film in substantially the same pattern as the pattern of discrete, raised projections of said other of said rollers;

(d) orienting said apertured film in both the cross-machine direction and in the machine-direction to increase the open area of said apertures, said oriented film, with the apertures formed therein, being substantially planar and being free of continuous strand-like sections disposed in different planes; and (e) embossing the oriented film on at least one surface with a plurality of raised members spaced closer to each other than the spaces between the apertures in the oriented film to thereby provide a matte-type finish on said at least one surface.

2. The process of claim 1, wherein the secant modulus of the polymer from which the film is extruded is no more than about 20,000 psi.

3. The process of claim 1, wherein the thermoplastic polymer is selected from the group consisting of low density polyethylene, low density polyethylene copolymers, linear low density polyethylene, very low density polyethylene, ultra low density polyethylene, and blends thereof.

4. The process of claim 1 wherein the thermoplastic polymer includes blends of polymers in which the major component is selected from the group consisting of low density polyethylene, low density polyethylene copolymers, linear low density polyethylene, very low density polyethylene and ultra low density polyethylene.

5. The process of claim 3 wherein the thermoplastic polymer includes pigments or processing aids.

6. The process of claim 1 wherein the thermoplastic film is formed primarily from an ultra low density polyethylene/octene copolymer having a secant modulus of no more than 20,000 psi.

7. The process of claim 1 wherein said discrete raised projections on the other of said rollers are disposed in a hexagonal pattern, and the concentration of said projections in one of said machine direction and cross machine direction is such that the hexagonal pattern repeats less than 50 times per inch.

8. The process of claim 1 wherein said discrete raised projections on the other of said rollers are disposed in a hexagonal pattern, and the concentration of said projections in one of said machine direction and cross machine direction is such that the hexagonal pattern repeats less than 35 times per inch.

9. The process of claim 6, wherein the concentration of said projections is such that the hexagonal pattern repeats no more than 25 times per inch in one of said machine direction and cross machine direction.

10. The process of claim 6, wherein the concentration of said projections is such that the hexagonal pattern repeats in the range of 25 to 35 times per inch in one of said machine direction and cross machine direction.

11. The process of claim 8, wherein the concentration of said projections is such that the hexagonal pattern repeats 25 times per inch in one of said machine direction and cross machine direction.

12. The process of claim 1 wherein said discrete raised projections on the other of said rollers are disposed in a regular geometric pattern, and the concentration of said projections in one of said machine direction and cross machine direction is such that the regular geometric pattern repeats less than 50 times per inch.

13. The process of claim 1 wherein said discrete raised projections on the other of said rollers are disposed in a regular geometric pattern, and the concentration of said projections in one of said machine direction and cross machine direction is such that the regular geometric pattern repeats less than 35 times per inch.

14. The process of claim 13, wherein the concentration of said projections is such that the regular geometric pattern repeats no more than 25 times per inch in one of said machine direction and cross machine direction.

15. The process of claim 13, wherein the concentration of said projections is such that the regular geometric pattern repeats in the range of 25 to 35 times per inch in one of said machine direction and cross machine direction.

16. The process of claim 15, wherein the concentration of said projections is such that the regular geometric pattern repeats 25 times per inch in one of said machine direction and cross machine direction.

17. The process of claim 1, wherein the discrete projections are substantially cone-shaped, and form a plurality of small apertures, each of which is defined by a substantially smooth, continuous curved surface free of sharp edges when the film is oriented in both the machine direction and the cross machine direction.

18. The process of claim 17, wherein the thermoplastic film is selected from the group consisting of low density polyethylene, low density polyethylene copolymers, linear low density polyethylene, very low density polyethylene, ultra low density polyethylene and blends thereof.

19. The process of claim 18 wherein the thermoplastic polymer includes blends of polymers in which the major component is selected from the group consisting of low density polyethylene, low density polyethylene copolymers, linear low density polyethylene, very low density polyethylene and ultra low density polyethylene.

20. The process of claim 18 wherein the thermoplastic polymer includes pigments or processing aids.

21. The process of claim 17 wherein the thermoplastic film is formed primarily from an ultra low density polyethylene/octene copolymer having a secant modulus of no more than 20,000 psi.

22. The process of claim 17 wherein said discrete raised projections on the other of said rollers are disposed in a hexagonal pattern, and the concentration of said projections in one of said machine direction and cross machine direction is such that the hexagonal pattern repeats no more than 35 times per inch.

23. The process of claim 22, wherein the concentration of said projections is such that the hexagonal pattern repeats no more than 25 times per inch in one of said machine direction and cross machine direction.

24. The process of claim 22, wherein the concentration of said projections is such that the hexagonal pattern repeats in the range of 25 to 35 times per inch in one of said machine direction and cross machine direction.

25. The process of claim 24, wherein the concentration of said projections is such that the hexagonal pattern repeats 25 times per inch in one of said machine direction and cross machine direction.

* * * * *

UNITED STATES PATENT AND TRADEMARK OFFICE
CERTIFICATE OF CORRECTION

PATENT NO. : 5,262,107
DATED : November 16, 1993
INVENTOR(S) : Edward E. Hovis and Eric D. Johnson It is certified that error appears in the above-indentified patent and that said Letters Patent is hereby corrected as shown below:

On the title page, item [21], change Appl. No. "860,250" to --860,258--.

Signed and Sealed this

Nineteenth Day of April, 1994

BRUCE LEHMAN

Attest:

Attesting Officer

Commissioner of Patents and Trademarks